United States Patent
Daly et al.

(10) Patent No.: US 6,432,488 B1
(45) Date of Patent: Aug. 13, 2002

(54) MATTE FINISH POWDER

(75) Inventors: Andrew T. Daly, Sinking Spring; Richard P. Haley; Edward G. Nicholl, both of Reading, all of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/627,672

(22) Filed: Jul. 28, 2000

(51) Int. Cl.$^7$ ................................................. B05D 1/06
(52) U.S. Cl. ..................... 427/474; 427/485; 523/462; 523/465; 525/194; 525/199; 525/208; 525/209; 528/408; 528/418
(58) Field of Search ................................ 523/462, 465; 525/194, 199, 208, 209; 528/408, 418; 427/474, 485

(56) References Cited

U.S. PATENT DOCUMENTS

| | | | | |
|---|---|---|---|---|
| 4,237,037 A | 12/1980 | Takahashi | .................. | 260/28.5 |
| 4,346,144 A | 8/1982 | Craven | ........................ | 428/335 |
| 4,390,664 A | 6/1983 | Kanayama | .................. | 525/117 |
| 5,212,623 A | 5/1993 | Schreffler | ................... | 525/533 |
| 5,470,893 A * | 11/1995 | Sinclair-Day | ................ | 523/205 |
| 5,721,052 A | 2/1998 | Muthiah et al. | ............. | 428/413 |
| 5,856,378 A | 1/1999 | Ring et al. | ................... | 523/205 |
| 5,925,285 A | 7/1999 | Ramesh | ................. | 252/182.28 |
| 6,093,774 A * | 7/2000 | Damain | ....................... | 523/205 |
| 6,130,297 A | 10/2000 | Ramesh | .................... | 525/327.3 |

OTHER PUBLICATIONS

Lee and Neville, Handbook of Epoxy Resin, p. 10–17, 11–17, 12–3, 1967.*

* cited by examiner

*Primary Examiner*—Robert Dawson
*Assistant Examiner*—D. Aylward

(57) ABSTRACT

A powder coating composition and method of applying it to a substrate, such as medium density fibreboard, consisting of a glycidyl methacrylate resin, a dicarboxylic acid cross-linking agent, a catalyst selected from phosphines, phosphonium, ammonium 2-phenyl-2-imidazoline, substituted imidazoline and isopropyl imidazole Bis-A epoxy resin adduct and a matte texturing agent. The inventive formulation is able to create a matte texture finish on the surface of the substrate. Since the cured final coating is resistant to yellowing and moisture, it is of great utility in the kitchen cabinet making industry.

16 Claims, No Drawings

MATTE FINISH POWDER

The present invention relates to powdered thermosetting compositions comprising a glycidyl group containing acrylic copolymer, and particularly, to powdered thermosetting compositions which produce a uniform matte texture after application and cure onto the surface of a substrate. The invention also relates to the use of said compositions for the preparation of powdered paints which produce non-yellowing uniform matte texture coatings and also to the coatings obtained by the use of these compositions.

BACKGROUND OF THE INVENTION

Powdered thermosetting compositions are widely utilized for coating numerous objects. Such compositions have gained considerable popularity in the surface coatings industry for various reasons. For one, since they are virtually free of the potentially harmful fugitive organic solvents which are normally present in liquid coatings, they are safer to handle and apply. Further, their use results in less damage which might be caused to the surrounding environment by the release of these potentially harmful solvents.

Powder coatings generally contain one or more organic thermosetting binders, fillers, pigments, catalysts and various other additives to modify their properties to suit their intended use. There are two principal types of powdered thermosetting compositions, the first of which consists of a mixture of carboxyl group-containing polymers, such polymers comprising polyesters or polyacrylates, and epoxy compounds, such as cyanurates, and the second of which consists of a mixture of hydroxyl group-containing polymers, such polymers being polyesters, and isocyanates blocked with phenol or caprolactam.

These powder coatings are generally prepared as follows. The polymer, cross-linking agent, catalyst, pigments, fillers and other additives, if any, are first dry blended. The resulting mixture is then conveyed to an extruder, heated to between 80° and 120° C. while being forced through the extruder head in order to homogenize the various ingredients of the powder coating. The homogenized mixture is then cooled and ground into a powder having a particle size of between 20 and 150 microns. The fine powder thus obtained is then applied onto a pre-heated substrate by conventional means, such as by an electrostatic spray gun. The coated substrate is then heated in an oven for a time sufficient to cross-link the binder and achieve cure of the powder coating.

Powdered coating compositions in general give coatings which have good adhesion and exhibit excellent weatherability. However, the majority of these compositions result in coatings having high gloss after fusion and coating. Gloss is measured at an angle of 60°, in accordance with the test method set forth in ASTM D523. High gloss finishes typically have reflection values which exceed 90%.

With an ever increasing demand for powdered coatings which provide matte texture finishes, many attempts have been made to achieve this objective. However, it has proven difficult under conventional methods of extrusion and curing to produce powdered coatings capable of producing a matte texture in a consistent, uniform and reliable way. One proposed solution involved the inclusion of matting agents, such as silica, talcum, chalk or metal salts, in the powder coating formulation. However, this approach proved unacceptable because of poor adhesion and an inconsistent, or mottled, surface appearance. Another approach, as set forth in EP patent 165207 is to incorporate waxes, such as a polyolefin wax, and metal salts, such as 2-benzothiazolethiolate, into powder coating compositions based on carboxyl group-terminated polyesters and epoxy compounds. However, the waxes migrate readily to the surface of the final coating, causing unacceptable variations in the degree of matt texture as it ages. Similarly, U.S. Pat. No. 4,242,253 discloses the use of calcium carbonate and finely divided polypropylene particles as additives, to provide low gloss coatings. A disadvantage of this system is that the inorganic fillers, which are often required in significant amounts in order to reduce gloss, can damage the extruders and impair the quality of the finished coating by exhibiting a rough and irregular surface finish. Furthermore, and most fundamentally, the need to include additional fillers adds to the cost of the coating.

One attempt at obtaining a matte texture provided for the dry-blending of two powdered thermosetting compositions subsequent to each having been separately extruded. This process is exemplified in U.S. Pat. No. 3,842,035. As described herein, one composition is slow curing (long gel time) and the other is fast curing (short gel time). The use of this system results in a coating that has a matte texture, without the need to use a specific matte producing agent. The problem with this system, however, is the requirement of having to dry blend large amounts of formulated powders. This is not an easy task, especially on an industrial scale. Moreover, since this formulation cannot be produced on a continuous basis but only in individual batches of powder, each batch of powder will vary ever so slightly from any other, thus resulting in variations in the appearance of the matte finish. Further, because dry-blending is less efficient than extrusion to commingle all of the formulation ingredients, powder which is recovered after spraying and recycled for re-application may not have the same formulation as it did when first sprayed, thus giving rise to more variations in the matte appearance.

There are other systems which are intended to make matte texture coatings wherein two polymers of different types or rates of reaction are employed, together with one or more cross-linking agents, such that two distinct cross-linking mechanisms or two different reaction rates are induced. In such systems, the blending of the various powder components may be carried out in a continuous extrusion process. For example, JP 154771/88 discloses a resin composition for a matte texture powder coating which comprises a mixture of a branched hydroxyl group containing polyester having a high hydroxyl number with another hydroxyl group containing polyester having a lower hydroxyl number, together with a blocked isocyanate as the cross linking agent.

EP 366608 A describes matte texture producing powdered paints obtained by a single extrusion process which include two cross-linking agents. These formulations contain an epoxy resin, in particular, bisphenol A diglycidyl ether, a polycarboxylic acid, such as 2,2,5,5-tetra (β-carboxyethyl) cyclopentanone, as the first cross-linking agent, and a saturated carboxyl group-terminated polyester, tolylbiguanide or dicyandiamide as the second cross-linking agent.

A further approach to providing matte texture coatings is disclosed in EP 104424 A. Herein, the powder coating composition contains both a hydroxyl group containing polyester resin, and a polyepoxy compound, such as triglycidyl isocyanurate, as the binder. It teaches the use of a particular cross-linking agent which contains both carboxyl groups (to react with the epoxy compound) and blocked isocyanate groups (to react with the hydroxyl group containing resin). Total control over the extrusion temperature and shear rates is required in order to achieve and/or maintain uniform blending of the formulation ingredients. Otherwise, an inconsistent matte texture finish coating results.

STATEMENT OF THE INVENTION

It is therefore an object of the present invention to provide a powder coating which results in a uniform non-yellowing matte texture finish exhibiting good UV and moisture resistance versus the vinyl laminate coating systems which have been used for years in the coating of kitchen cabinet doors and the like. The present invention provides a powder coating consisting of a glycidyl group containing acrylic copolymer resin, a dicarboxylic acid cross-linking agent, a select catalyst and a matte, texturing agent. The powder coating of the invention produces a matte texture having a substantially uniform appearance.

DETAILED DESCRIPTION

The present invention provides a powdered thermosetting composition which consists of a glycidyl methacrylic (GMA) resin, a difunctional carboxylic acid cross-linking agent and a catalyst selected from the group consisting of phosphines, phosphonium, ammonium and certain imidazoles, specifically 2-phenyl-2-imidazoline, substituted imidazole (50% active on castor oil) and isopropyl imidazole Bis-A epoxy resin adduct. This invention also provides a method for coating a non-yellowing, uniform matte textured finish on heat sensitive substrates, such as wood. For the purpose of this invention, wood is defined as any lignocellulosic material whether it comes from trees or other plants and whether it is in its natural form, shaped in a saw mill, separated into sheets and made into plywood, chipped and made into particle board or had its fibers separated, felted and compressed.

The glycidly methacrylate (GMA) resin is in the form of a copolymer which may be produced by copolymerizing between 20 and 100 wt % glycidly acrylate or glydicidyl methacrylate and between 0 and 80 wt % other alpha, beta ethylenically unsaturated monomers, such as methyl methacrylate, butyl methacrylate and styrene. Such resin typically has a weight average molecular weight of from 3,000 to 200,000, and preferably, from 3,000 to 20,000, as determined by gel permeation chromatography. The viscosity of the GMA is preferably between 10 and 500 poise, and most preferably between 30 and 300 poise at 150° C., as determined by an ICI Cone and Plate Viscometer.

The GMA can be prepared under traditional reaction conditions known in the art. For example, the monomers can be added to an organic solvent such as xylene and the reaction conducted at reflux in the presence of an initiator such as azobisisobutyronitrile or benzoyl peroxide. An exemplary reaction may be found in U.S. Pat. No. 5,407,706. In addition, such resins are commercially available under the trademark ALMATEX from the Anderson Development Company of Adrian, Mich. The GMA resin is present in the powder coating composition in an amount ranging from 20 to 100 phr (parts per hundred parts resin plus curing agent).

The cross-linking agent is a difunctional carboxylic acid. The functionality number relates to the number of —COOH moieties on the molecule. Preferred dicarboxylic acids are sebacic acid and polyanhydrides, both well known cross-linking agents which are commercially available. If sebacic acid is used in the formulation, it is present in an amount up to 22 phr (i.e., from 0 to 22 phr), preferably from 14 to 22 phr. If a polyanhydride is employed, such as 1,12-dodecanedioic polyaiihydride (e.g., VXL 1381, from Vianova), it may be present in an amount of up to 35 phr, preferably 23–29 phr. If desired, both cross-linking agents may be used together.

The catalysts which may be employed are phosphines, phosphonium, ammonium and imidazoles selected from the group consisting of 2-phenyl-2-imidazoline, substituted imidazole (50% active on castor oil) and isopropyl imidazole Bis-A epoxy resin adduct. The most preferred catalyst is the isopropyl imidazole Bis-A epoxy resin adduct. This catalyst is available from Ciba-Geigy Corp. as HT-3261. When utilized in this invention, it is added to the formulation in an amount ranging from 1 to 10 phr, preferably 2 to 5 phr.

The matte texturing agent is selected from the group consisting of polytetrafluoroethylene (PTFE), or mixtures of PTFE and low melting waxes, such as polyethylene and parafin. In the powder coating composition of the invention, the matte texturing agent may be added in an amount of from 1 to 10 phr, and preferably 2 to 6.

The powder coating composition may also contain fillers or extenders. These extenders may include, without limitation, calcium carbonate, barium sulfate, wollastonite and mica. When present, they are added in amounts up to 120 phr, depending on the finish coating characteristics that are desired.

Further, the powder coating composition of the present invention may include traditional additives to impart various physical characteristics to the finished coating or to assist in the formulating and application of the composition. Such additives include, for example, flow additives, degassing agents and slip additives, such as siloxane.

The powder coating composition of this invention is prepared by conventional techniques which are well known in the art of formulating powder coatings. Typically, the components of the powder coating are thoroughly blended together and then melt blended in an extruder. Melt blending is typically carried out in the temperature range of between 140° and 180° F. with careful control of the extrudate temperature to minimize any premature curing of the powder coating formulation in the extruder. These extruder temperatures are lower than the typical cure temperatures of the powder coating which may begin initial curing at temperatures as low as 250° F. The extruded composition, usually in sheet form, after cooling, is then ground in a mill, such as a Brinkman mill or Bantam hammer mill, to achieve the desired particle size.

The heat sensitive wood substrates which are targeted for coating by the powder coating of the present invention are, without limitation, hardwood, particle board, medium density fiberboard (MDF), electrically conductive particle board ECP), masonite or any other cellulose based materials. Wood substrates that are particularly suitable for use in this invention have a moisture content of from 3% to 10%. After being cut, milled, shaped and/or formed, these wood materials are generally used to make articles such as computer furniture, business furniture, ready to assemble furniture, kitchen cabinets and the like.

The powder coating compositions of the present invention have very low cure temperature properties. These properties provide a powder coating composition which can be readily applied, especially by electrostatic spraying, onto heat sensitive materials, particularly wood products, while at the same time, limiting the heat exposure time so as to avoid damaging the substrate. Ideally, the substrate is first preheated. In a preferred embodiment, MDF is preheated in an oven for 10 to 15 minutes at @350° to 375° F. The substrate is then coated when its surface temperature reaches between 170° and 240° F. The coated substrate is then post cured in an oven which is set at between 250° and 375° F. for a period time from 5 to 30 minutes. The surface temperature of the coated object should not exceed 300° F. The rate of cure is time/temperature dependent. An effective cure may be achieved with a cure temperature as low as 250° F. for 30 minutes. An equally effective cure may be achieved with a cure temperature of 375° F., but with a reduced oven residence time, as low as 5 minutes at that temperature. After the coating has been cured, the coated object is then cooled.

One significant objective in the coating of cut, shaped and/or routed pieces of wood, such as MDF materials that are made into kitchen cabinet doors and the like, is to reduce or entirely eliminate the outgassing of moisture from grooves routed out of or cut into the material. Outgassing will degrade the internal structural integrity of the substrate as well as form large, noticeable surface defects in the finished coating. By formulating coatings which cure at lower temperatures, the potential for outgassing is reduced or eliminated entirely.

Various methods, well known in the art, may be used to apply the powder coatings onto substrate surfaces. A highly preferred method is electrostatic spraying. The method of the present invention will therefore be discussed hereinafter with reference to this technique. Electrostatic spraying of powder coatings is based upon the principle of electrostatic charging. In electrostatic spraying, the powder particles receive charges by one of the two following methods. In the corona method, the powder coating particles are fed into a carrier gas stream through a corona discharge in a corona spray gun in order to transfer the electrical charge from the ionized discharged air molecules to the powder particles so that the powder particles become electrically charged. In the triboelectric method, use is made of the principle of frictional electricity. The powder particles rub against a friction surface of, usually, polytetrafluoroethylene (TEFLON), within the tribo gun and are given an electrostatic charge which is opposite that of the charge of the substrate surface. After charging, the particles are ejected as a cloud through the spray gun nozzle by virtue of their electrical charge and output carrier gas pressure to the vicinity of the electrically grounded target substrate article. The charged spray particles are attracted to the grounded substrate by virtue of the difference in their respective charges. This causes the particles to deposit as a uniform coating on the desired surface, including cut out grooves and edges. The charged powder adheres to the substrate for a period of time sufficient to permit transfer of the coated article to an oven. A subsequent cure in the oven transforms the powder coating into a uniform, continuous coating having the desired matte textured finish with the ability to resist yellowing.

The present invention will now be further clarified by considering specific examples which are intended to be exemplary of the scope thereof.

EXAMPLES

The following examples were formulated according to the disclosure of the present invention. The substrates coated with the powder coatings of the invention all exhibit a uniform non-yellowing matte texture finish. The term "matte" is used to define a surface finish which reflects back only a small portion of the incident light shined upon it. In accordance with the protocols set forth in ASTM D523, gloss is measured by the intensity of reflected light, as a percentage, as compared with the intensity of the incident light directed at a surface finish at an angle of 60 degrees. A "matte" finish will have a gloss value of less than or equal to 15 units. All component quantities are expressed in parts per hundred ("phr") of the amount of resin plus curing agent.

Example 1

| Ingredients | phr | Material | Utility |
|---|---|---|---|
| PD 7690 GMA resin (Anderson Development Co.) | 82 | glycidyl methacrylic polymer | resin |
| Sebacic acid | 15 | | curing agent |
| HT 3261 (Ciba-Geigy Corp.) | 2.0 | isopropyl imidazole epoxy adduct | catalyst |
| Resiflow P-67 | 2.0 | acrylate/silica | flow agent |
| Powdertex 61 | 2.0 | PTFE | texturing agent |
| Nyad 325 | 25.0 | barium sulfate | filler |
| Raven 1255 | 2.0 | | pigment |

The blended ingredients were then melt mixed using a Baker Perkins 30 mm extruder. The extrudate was then mixed with 0.2% of a dry flow enhancer, aluminum oxide, and ground using a Brinkman grinder having a 12 pin rotor and a 1.0 screen. The ground powder was then sieved through a 140 mesh screen. The fine powder particles were then electrostatically sprayed using a corona discharge gun onto ⅝ inch MDF panels at a thickness of 0.004 to 0.0065 inch (4.0 to 6.5 mils). The MDF panels were first preheated for 15 minutes at 350° F. and coated when the panel surface temperature reached approximately 215° F. After waiting one minute to allow the sprayed on powder to flow and set, the panels were then placed in a curing oven, set at 350° F., for a period of 5 minutes.

After cooling, the following coating characteristics were observed and measured.

| Property | Result |
|---|---|
| Gel time at 300° F. | 59.2 seconds |
| Hot plate melt flow at 300° F. | 13–15 mm |
| 60° Gloss | 4.0–4.2 |
| Appearance | Uniform Texture |

Example 2

| Ingredients | phr | Material | Utility |
|---|---|---|---|
| PD 7690 GMA resin (Anderson Development Co.) | 82 | glycidyl methacrylate resin | resin |
| sebacic acid | 15 | | curing agent |
| HT 3261 (Ciba-Geigy Corp.) | 2.0 | isopropyl imidazole epoxy resin adduct | catalyst |
| Resiflow P-67 | 2.0 | acrylate/silica | flow agent |
| EX 542 | 1.0 | benzoin | degassing agent |
| Synflow 183TX | 4.5 | PTFE | texturizing agent |
| Uvitex OB | 0.1 | | brightening pigment |
| Trioxide TR 93 | 40 | TiO2 | pigment |
| Red RO 3097 | 0.002 | red | pigment |
| Black Shep 1 | 0.03 | black | pigment |

The resulting powder was then formulated as shown in Example 1 and applied to the same type of MDF panels. The surface properties after curing are shown below:

| Properties | Results |
| --- | --- |
| Gel time at 300° F. | 145 seconds |
| Hot plate melt flow at 300° F. | 15 mm |
| 60° Gloss | 6.0 |
| MEK resistance (50 double rubs) | slight rub off |
| Appearance | uniform texture |

Example 3

The following example was prepared using a different curing agent.

| Ingredients | phr | Material | Utility |
| --- | --- | --- | --- |
| 1436 VSC (Vianova) | 77.5 | glycidyl methacrylate polymer | resin |
| VXL-1381 (Vianova) agent | 22.5 | polyanhydride | curing |
| HT-3261 | 2.0 | isopropyl imidazole | catalyst |
| TX-183 | 2.0 | PTFE | texturizing agent |
| TR 93 | 40 | titanium dioxide | pigment |

This example was formulated the same way as were examples 1 and 2. However, because of the polyanhydride curing agent, the coated MDF panels were able to be coated at a temperature of 170–180° F. This still resulted in a durable matte texture being produced on the panels as shown below.

| Property | Result |
| --- | --- |
| Gel time at 300° F. | 121.3 seconds |
| Hot plate melt flow at 300° F. | 16 mm |
| 60° Gloss | 10–13 |
| Appearance | Uniform texture |

In order to show that the use of different catalysts produces unacceptable results formulations A, B and C were then prepared which compare the effects of using different catalysts. Example 4 was prepared in accordance with the present invention.

| | Amounts in phr | | | |
| --- | --- | --- | --- | --- |
| Ingredients | A | B | C | 4 |
| PD 7690 | 82 | 82 | 82 | 82 |
| sebacic acid | 15 | 15 | 15 | 15 |
| 2-methimidazole epoxy resin adduct | | | 2 | |
| 2-heptadecylimidazole | 0.15 | | | |
| 2-phenylimidazole | | 0.15 | | |
| HT-3261 | | | | 2.0 |
| Resiflow P-67 | 2.0 | 2.0 | 2.0 | 2.0 |
| EX 542 | 1.0 | 1.0 | 1.0 | 1.0 |
| TR 93 | 40 | 40 | 40 | 40 |
| Uvitex OB | 0.1 | 0.1 | 0.1 | 0.1 |
| RO 3097 | 0.002 | 0.002 | 0.002 | 0.002 |
| Shep Black | 0.03 | 0.03 | 0.03 | 0.03 |
| Synflow 183 TX | 4.5 | 4.5 | 4.5 | 4.5 |

The various formulations were then prepared and then applied onto MDF panels as shown in Examples 1 and 2. The results follow.

| Property | A | B | C | 4 |
| --- | --- | --- | --- | --- |
| Gel time at 300° F. | 184 sec | 149 sec | 90 sec | 113 sec |
| Hot plate melt flow at 300° F. | 16 mm | 16 mm | 13 mm | 15 mm |
| 60° Gloss | 26 | 29 | 5.5 | 6.0 |
| Appearance | Glossy texture | Glossy texture | Mottled, flat texture, very yellow | Uniform matte texture, non-yellow |

We claim:

1. A powder coating composition comprising a glycidyl methacrylate resin, a dicarboxylic acid cross-linking agent, isopropyl-imidazole Bisphenol-A epoxy resin adduct as a catalyst, and a matte texturizing agent.

2. The composition of claim 1 wherein the glycidyl methacrylate resin is present in an amount of 20 to 100 phr.

3. The composition of claim 1 wherein the dicarboxylic acid cross linking agent is selected from the group consisting of sebacic acid and 1,12-dodecanedioic polyanhydride.

4. The composition of claim 3 wherein the sebacic acid, when present, is in an amount of up to and including 22 phr.

5. The composition of claim 3 wherein the 1,12-dodecanedioic polyanhydride, when present, is in an amount of up to and including 35 phr.

6. The composition of claim 1 wherein the matte texturing agent is selected from the group consisting of polytetrafluoroethylene (PTFE), and mixtures of PTFE and low melting waxes.

7. The composition of claim 1 wherein the isopropyl imidazole Bis-A epoxy resin adduct is present in an amount from 1–10 phr, inclusive.

8. A method of creating a non-yellowing matte texture finish coating on a substrate comprising applying onto the surface of the substrate and curing, a powder coating composition comprising a glycidyl methacrylate resin, a dicarboxylic acid cross-linking agent, an isopropyl imidazole Bisphenol-A epoxy resin adduct as a catalyst, and a matte texturizing agent; and curing the deposited powder coating composition.

9. The method of claim 8 wherein the glycidyl methacrylate resin is present in an amount from 20–100 phr; the dicarboxylic acid cross-linking agent is present in an amount up to 35 phr; and the catalyst is present in an amount from 1 to 10 phr.

10. The method of claim 8 wherein the dicarboxylic acid crosslinking agent comprises sebacic acid present in an amount up to and including 22 phr.

11. The method of claim 8 wherein the dicarboxylic acid crosslinking agent comprises 1,12-dodecanedioic polyanhydride present in an amount up to and including 35 phr.

12. The method of claim 8 wherein the matte texturing agent is selected from the group consisting of polytetrafluoroethylene (PTFE), and mixtures of PTFE and low melting waxes.

13. The method of claim 8 wherein the substrate is medium density fibreboard.

14. The method of claim 8 wherein the PTFE is present in an amount from 1–10 phr, inclusive.

15. The method of claim 8 wherein the substrate is a heat sensitive wood substrate.

16. The method of claim 8 wherein the powder coating composition is applied by electrostatic spraying.

* * * * *